United States Patent [19]

Spurlock et al.

[11] 4,447,382
[45] May 8, 1984

[54] APPARATUS FOR MAKING FOAM CARPET PAD

[75] Inventors: Robert C. Spurlock, Forth Worth, Tex.; Larry W. Foster, Houston, Miss.

[73] Assignee: MPI, Inc., Fort Worth, Tex.

[21] Appl. No.: 347,002

[22] Filed: Feb. 8, 1982

[51] Int. Cl.³ .............. B29D 27/00; B32B 5/16; B32B 5/18; B32B 27/40
[52] U.S. Cl. .................. 264/123; 56/377; 141/266; 141/280; 198/526; 198/616; 209/241; 209/245; 209/257; 209/261; 264/109; 264/DIG. 7; 264/DIG. 69; 425/83.1; 425/371; 425/817 R
[58] Field of Search ............ 425/80.1, 81.1, 82.1, 425/83.1, 371, 372, 817 R; 56/158, 376, 377; 209/240, 241, 245, 255, 257, 261, 922; 198/523, 198/526, 616, 637; 141/266, 280; 264/DIG. 7, 122, 264/123, 109, DIG. 69

[56] References Cited

U.S. PATENT DOCUMENTS

| 2,276,869 | 3/1942 | Pond | 425/81.1 X |
|---|---|---|---|
| 2,295,155 | 9/1942 | Brown et al. | 425/80.1 X |
| 2,390,680 | 12/1945 | Ausherman | 56/158 |
| 2,635,301 | 4/1953 | Schubert et al. | 425/83.1 |
| 2,697,254 | 12/1954 | Gordon | 425/82.1 X |
| 2,732,928 | 1/1956 | Schreiber | 198/616 |
| 2,743,758 | 5/1956 | Uschmann | 425/80.1 X |
| 2,828,853 | 4/1958 | Hart | 209/241 X |
| 2,892,216 | 6/1953 | Steel | 264/DIG. 7 |
| 2,943,365 | 7/1960 | Erickson et al. | 425/80.1 |
| 3,114,722 | 12/1963 | Einhorn et al. | 264/DIG. 7 |
| 3,401,128 | 9/1968 | Terry | 264/DIG. 7 |
| 3,746,610 | 7/1973 | Hoegger | 264/109 X |
| 4,060,579 | 11/1977 | Schmitzer et al. | 264/51 |
| 4,111,744 | 9/1978 | Reiniger | 264/123 X |

FOREIGN PATENT DOCUMENTS 2423359  1/1975  Fed. Rep. of Germany ...... 425/371

OTHER PUBLICATIONS

"Whittington's Dictionary of Plastics", by Lloyd R. Whittington, Stamford, Conn., Technomic, c1968, Preface, pp. 98-101.
"Webster's New Collegiate Dictionary", Springfield, Mass., G. & C. Merriam Co., c1961, p. 294.

Primary Examiner—Philip E. Anderson
Attorney, Agent, or Firm—James E. Bradley

[57] ABSTRACT

An apparatus for making a foam pad for carpets has features to improve the quality of the pad. The apparatus has a hopper section for receiving foam particles coated with heat activated bonding agent. An extruder section compresses the particles as they are moved continuously along a conveyor belt. A heat section heats the particles after being compressed. A raking device in the hopper section rakes the top of the body of particles prior to entering the extruder section. The raking device rakes in a direction opposite to the movement of the body of particles. The raking device can be raised and lowered to change the level of the particles, and thus the density. The raking device also forms the top of the body of particles with upwardly tapered corners. A plate located below the hopper and extruder sections supports the lower conveyor belt. The heat section uses steam chambers with a perforated top, which also serves to support the conveyor belt.

6 Claims, 3 Drawing Figures

APPARATUS FOR MAKING FOAM CARPET PAD

BACKGROUND OF THE INVENTION

This invention relates in general to a method of making a pad from scrap foam particles, and in particular to an apparatus having features to improve the quality of the pad.

One type of pad for location beneath a carpet is made up of urethane foam scrap. The scrap normally comes from manufacturers of articles that use cushioning material, such as furniture and motor vehicle seat manufacturers. In constructing these pads, the scrap is shredded into irregularly shaped particles and screened to a size of about ⅜ inch to ¾ inch diameter. These particles are coated with a thermally activated bonding agent, then dumped into a hopper. The particles are drawn from the hopper into an precompressor section, which compacts the body of particles into a rectangular shape of desired size and density. In the prior art, the body is leveled at the top by a worker with a broom prior to entering the precompressor. The level prior to the precompressor was determined by a flat board that could be raised or lowered to vary the density.

The body of particles moves continuously from the hopper and precompressor sections into a heat section, which is preferably a steam chamber. A lower conveyor belt which is supported by rollers supports the body of particles and helps move it forward. Steam passes through the particles in the heat section to cause the bonding agent to set and bond the particles to each other. The foam bun proceeds out the end of the steam section and is cut into desired lengths. Subsequently the bun is cut longitudinally to provide pads of desired thickness.

In the prior art machines, while the pads were satisfactory, at times the bottom and sides of the bun would have splits and cracks.

SUMMARY OF THE INVENTION

In this invention, an apparatus is provided with a raking device located in the top of the hopper immediately before the precompressor section. The raking device rakes the top of the body of particles in a direction opposite to the travel of the body of particles. This provides a uniform height as the body proceeds into the precompressor section, resulting in uniform density. Also, the raking device is tapered upwardly at its side edges to provide greater height at the corners of the body than in the center.

The lower conveyor chain, which extends from the beginning of the hopper section past the end of the heat section, has a solid flat plate for supporting the upper reach or length. The steam chamber is divided into partitions, with the steam passing through perforations in the top of the plate that supports the upper reach of the chain.

DESCRIPTION OF THE PREFERRED EMBODIMENT

Figure 1:
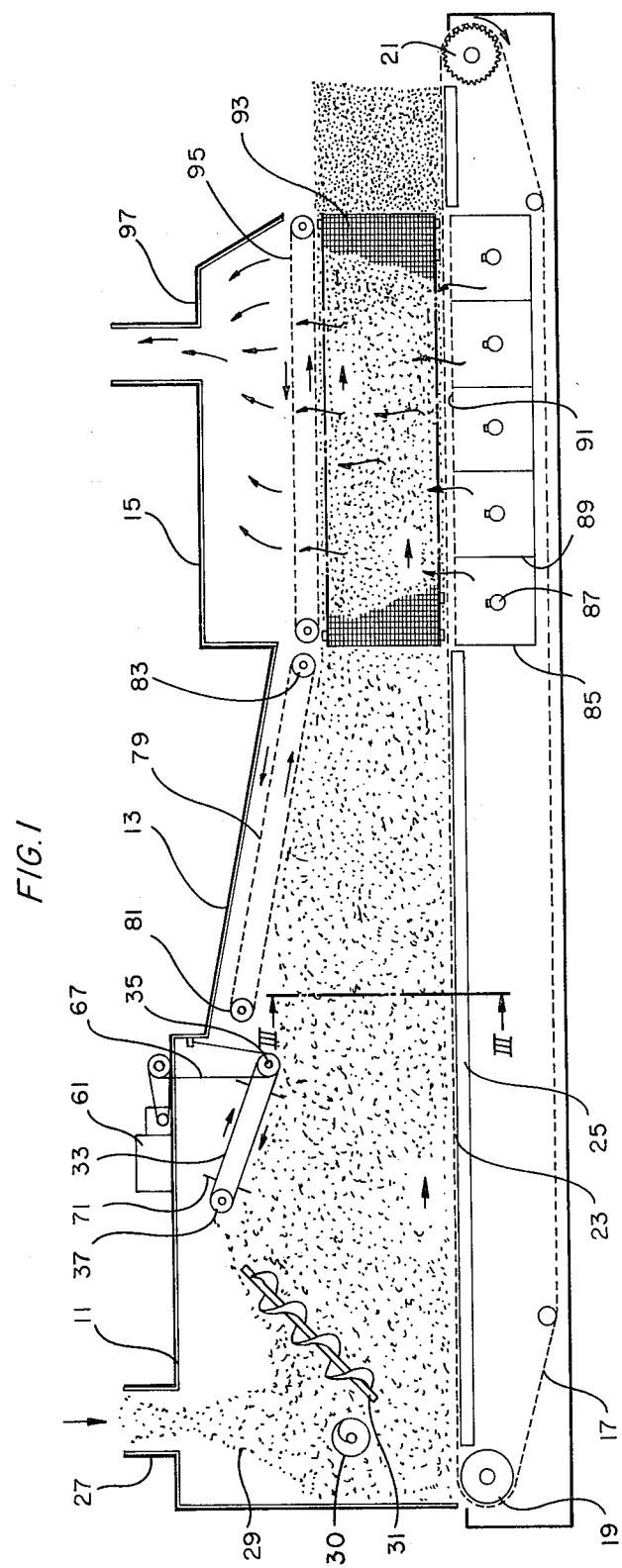
FIG. 1 is a side schematic view of an apparatus constructed in accordance with this invention.

Referring to FIG. 1, the apparatus for continuously forming foam carpet pad includes a hopper section 11, an precompressor section 13, and a heat section 15. A continuous lower conveyor belt 17 extends from the rearward end of the hopper section 11 past the forward end of the heat section 15. Lower conveyor 17 is a metal mesh conveyor that extends the width of the apparatus and is rotated around a rearward sprocket 19 and a forward sprocket 21. One of the sprockets 19 and 21 is driven to rotate the lower conveyor 17. The upper reach 23 of conveyor 17 is supported in sliding engagement on a flat plate 25 that extends from rearward sprocket 19 to the forward end of the precompressor section 13.

Hopper section 11 is a rectangular open top container, with the bottom comprising part of plate 25. An outlet 27 from a mixing chamber (not shown) leads into hopper 11 for dumping foam particles 29 after they have been coated with a bonding agent. Horizontal and inclined augers 30 and 31 mounted in the hopper section 11 distribute the foam particles 29 into a body or mound for proceeding into the precompressor section. A raking means 33 is mounted at the top of hopper section 11 immediately before precompressor section 13 for raking the top of the body of particles 29 to a desired level.

Figure 2:
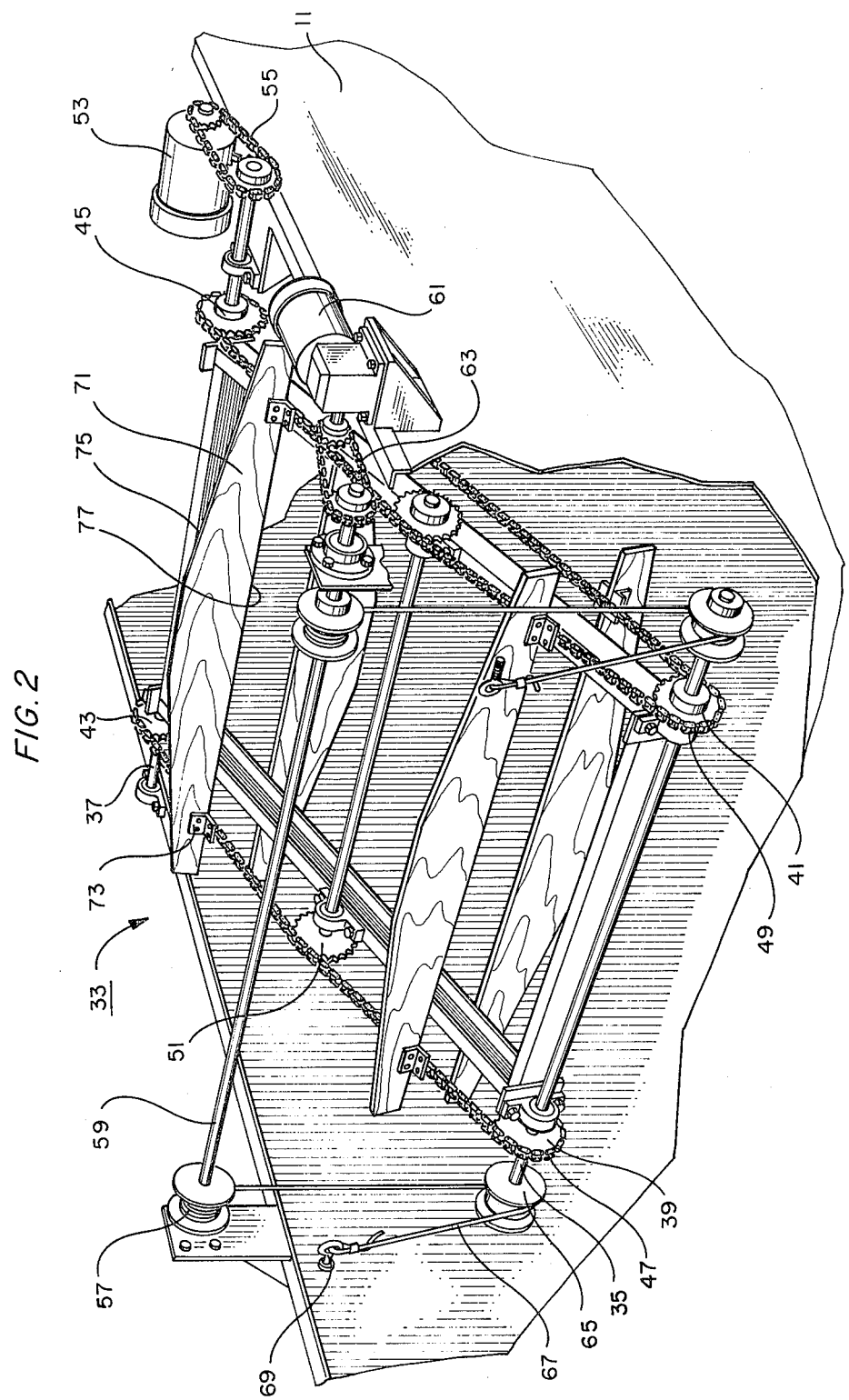
FIG. 2 is a perspective view, partially broken away, of the raking device of the apparatus of FIG. 1.

Referring to FIG. 2, the raking means 33 includes a forward axle 35 and a rearward axle 37 mounted parallel with each other and with plate 25. Axles 35 and 37 are spaced apart longitudinally along the length of the apparatus. Forward axle 35 has two spaced-apart sprockets 39 and 41, each of which is secured to forward axle 35 for rotation. Similarily, the rearward axle 37 has sprockets 43 and 45 spaced apart from each other and driven by rearward axle 37. A chain 47 extends between and around sprockets 39 and 43. A chain 49 extends between sprockets 41 and 45. Each chain 47 and 49 is maintained in tension by idler sprockets 51.

Rearward axle 37 is driven by drive means that includes an electrical motor 53 linked by a drive chain 55. Rearward axle 37 is mounted in a stationary position to the vertical sidewalls of the hopper section 11. The forward axle 35 is normally carried at a lower level than the rearward axle 37 and have leveling means for varying the vertical position at which it will be carried. The leveling means includes a pair of pulleys 57 rotatably mounted to the sidewalls of hopper section 11. The pulleys are mounted on a single axle 59 that is driven by and electrical motor 61 through a drive chain 63. Forward axle 35 has sheaves 65 located on each end. Each cable 67 is wound about a pulley 57, extends around sheave 65, and is secured to the sidewall of hopper section 11 by an eyebolt 69. Rotating pulley axle 59 in one direction causes the cables 67 to wind around pulleys 57 and raise the vertical position of the forward axle 35. Rotating axle 59 in the opposite direction with the electrical motor 61, causes the forward axle 35 to move to a lower position.

The raking device also includes a plurality of paddles or blades 71 of which four are shown in the preferred embodiment. Paddles 71 are secured by brackets 73 to each chain 47 and 49 for movement with the chains. Paddles 71 are preferably wooden, flat members that extend substantially the width between the two vertical sidewalls of hopper section 11. Paddles 71 have an outer edge 75 that is tapered or curved. Outer edge 75 results in the paddles 71 being wider at the center than at the sides. The inner edge 77 is straight and parallel with axles 35 and 37. In the preferred embodiment, the distance between inner edge 77 and outer edge 75 at the center section is six inches, and the distance at the side edges is three inches. The space between the paddles 71 and between the chains 47, 49 is open to allow particles to pass between the chains 47 and 49.

Referring again to FIG. 1, the precompressor section 13 has a closed top, vertical sidewalls, and a bottom that is made up of the forward section of plate 25. The precompressor section includes an inclined upper conveyor belt 79 driven between two rollers 81 and 83. Roller 81, the rearward roller, is spaced at a greater distance from plate 25 than the forward roller 83. Rearward roller 81 is also located at a greater distance from plate 25 than the forward axle 35 of the raking device 33. Upper conveyor 79 is rotated in a direction opposite to the rotation of the raking device 33 and lower conveyor 17.

The heat section 15 includes a plurality of compartments or chambers 85 mounted below the upper reach 23 of the lower conveyor belt 17. Each chamber 85 has an intake 87 that is connected to a conduit (not shown) leading from a source of steam. Chambers 85 are separated by vertical partitions 89. The top of the chambers 85 comprises a perforated plate 91 that is located at the same horizontal level as plate 25. Perforated plate 91 supports in sliding engagement the upper reach 23 of the lower conveyor belt 17. Two spaced-apart vertical conveyor belts 93 are located at the sides of the heat section 15 for facilitating movement of the body of particles 29 through the heat section. A horizontal conveyor belt 95 is located above the lower conveyor belt 17 and extends the length of the heat section 15. Conveyor belt 95 is a metal mesh belt to allow steam to pass through the belt. A hood 97 is mounted above conveyor belt 95 for collecting the steam that passes upward.

Figure 3:
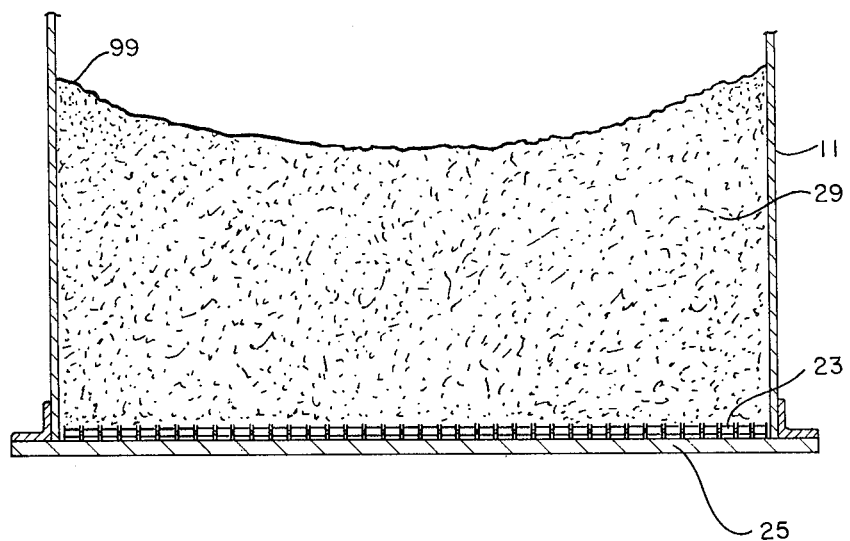
FIG. 3 is a sectional view of the apparatus of FIG. 1, taken along the line III—III.

In operation, foam particles 29, normally urethane, are lightly coated with a conventional thermally activated bonding agent or resin and dumped in through outlet 27 into hopper 11. Augers 31 move the body of particles 29 forward, as does the lower conveyor belt 17. The raking device 33 rotates in the same direction as conveyor belt 17, causing the paddles 71 when on the lower reach to rake in the opposite direction to the movement of the body of particles. The paddles 71 when on the lower reach continually smooth and rake the top of the body of particles as the body moves in a forward direction. As shown in FIG. 3, the curved outer edges 75 of the paddles 71 create upwardly turned corners 99. The upwardly turned corners provide greater thickness at the edges.

If it is desired to change the density of the body of particles, the forward axle of the raking device 33 can be lowered to lower the density or raised to increase the density. If raised, this allows a thicker body of particles to enter the precompressor section. The raising or lowering is accomplished by energizing motor 61 to raise or lower cable 67.

The top of the body of particles as it enters the precompressor section 13 will contact the lower reach of the inclined upper belt 79 somewhere around midpoint. Belt 79, which rotates opposite to lower conveyor 17, tends to push the particles forwardly and downwardly because of its downward inclination with respect to the lower conveyor belt 17. The body of particles is compacted to the desired density as it enters the heat section 15. Steam passes from the chambers 85 up through the perforated plate 91, through the upper reach 23 of the mesh conveyor belt 17, through the particles 29, through the mesh conveyor belt 95 and into and out of hood 97. The steam activates the bonding agent to cause it to bond the particles together. The body of particles then leaves the heat section in the shape of rectangular bun where it is cut into lengths, normally about 60 feet. Each bun is subsequently sliced horizontally to a desired pad thickness, then rolled for shipment.

The invention has significant advantages. The raking device provides a smooth top to the body or stream of particles prior to entering the precompressor section, thus assuring a desired density. The tapered configuration of the paddles increases the thickness of the body of particles at the sides prior to entering the precompressor sections. The greater thickness makes up for loss of particles at the sides due to dragging of the particles at the sides of the precompressor section. This greater thickness of the body prior to the precompressor section reduces splits and ragged sides. The plate located below the hopper and precompressor sections, and the perforated plate forming the top of the steam chambers, horizontally support the upper reach of the lower conveyor belt. This results in a smoother bottom on the bun, reducing splits and cracks.

While the invention has been shown in only one of its forms, it should be apparent to those skilled in the art that it is not so limited but is susceptible to various changes without departing from the scope of the invention.

We claim:

1. In a method for making a foam pad of the type that includes the steps of receiving in a hopper section foam particles coated with a heat activated bonding agent, moving a body of the particles from the hopper section into a precompressor section which has an inclined upper conveyor belt for compressing the particles, moving the particles into a heat section from the precompressor section for heating the particles, the improvement comprising:

raking in the hopper section the top of the body of the particles in a direction opposite to the direction of travel of the body of particles, while tapering upwardly the corners of the body of particles at the top to provide a concave upper surface for the body of particles prior to entering the precompressor section.

2. In an apparatus for making a foam pad of the type having a hopper section for receiving foam particles coated with a heat activating bonding agent, a precompressor section for compressing the particles, a heat section for heating the particles received from the precompressor section, and a conveyor belt for moving the particles from the hopper section through the precompressor and heat sections, the improvement comprising: raking the top of a body of said particles prior to its entering the precompression and heating section; said raking means having forward and rearward axles carried in the hopper section longitudinally apart from each other along the conveyor belt, with the forward axle being spaced closer to the conveyor belt than the rearward axle;

linkage means looped between and around each axle;

a plurality of spaced-apart paddles mounted on the outer runs of the linkage means;

drive means for rotating the linkage means with the mounted paddles around the axles to rake the top of a body of the particles prior to entering the precompressor section; and leveling means for selectively raising and lowering the forward axle while maintaining the rearward axle stationary to change the level of the body of particles.

3. In an apparatus for making a foam pad of the type having a hopper section for receiving foam particles coated with heat activated bonding agent, a precompressor section having an inclined upper conveyor belt for compressing the particles, a heat section for heating the compressed particles, and a lower conveyor belt for moving the particles longitudinally from the hopper section through the precompressor and heat sections, the improvement comprising:

raking means mounted into the hopper for raking the top of a body of the particles prior to entering the precompressor section, comprising a plurality of paddles mounted on and rotatable around at least one axle;

the paddles each extending substantially the width of the hopper section and being wider in a center section than at the ends of the paddles to provide a concave upper surface to the body of particles prior to entering the precompressor section.

4. In an apparatus for making a foam pad of the type having a hopper section for receiving foam particles coated with heat activated bonding agent, a precompressor section having an inclined upper conveyor belt for compressing the particles, a heat section for heating the compressed particles, and a lower conveyor belt for moving the particles longitudinally from the hopper section through the precompressor and heat sections, the improvement comprising:

raking means mounted in the hopper section for making the top of a body said particles prior to its entering the precompression and heat section; said raking means having forward and rearward axles carried in the hopper section longitudinally apart from each other, each axle having laterally spaced-apart sprockets;

a pair of chains looped around the sprockets of each axle;

a plurality of paddles mounted between the chains parallel with the axles with open spaces being provided between the chains and paddles to enable particles to pass between the chains;

drive means for rotating the chains in a direction opposite to the direction of rotation of the upper conveyor belt; and leveling means for selectively raising and lowering the forward axle.

5. An apparatus for making a foam pad, comprising in combination:

a hopper section having an open top for receiving foam particles coated with a heat activated bonding agent;

a precompressor section forward of the hopper section, having an upper conveyor belt that inclines downwardly to gradually compress a body of the particles;

a flat plate extending horizontally through the hopper and precompressor sections to define the bottom of the hopper and precompressor sections;

a heat section forward of the precompressor section and having a steam chamber at its bottom with a perforated top for releasing steam into the particles; and a mesh lower conveyor belt driven between rollers located at the rearward end of the hopper section and forward end of the heat section, the lower conveyor belt slidingly engaging and being supported by the plate of the hopper and precompressor sections and the perforated top of the steam chamber.

6. The apparatus according to claim 5 where in the steam chamber is divided into a plurality of separate compartments by vertical partitions.

* * * * *